(12) United States Patent
Alba et al.

(10) Patent No.: US 10,902,346 B2
(45) Date of Patent: Jan. 26, 2021

(54) EFFICIENT SEMI-SUPERVISED CONCEPT ORGANIZATION ACCELERATED VIA AN INEQUALITY PROCESS

(71) Applicant: INTERNATIONAL BUSINESS MACHINES CORPORATION, Armonk, NY (US)

(72) Inventors: Alfredo Alba, Morgan Hill, CA (US); Kenneth L. Clarkson, Madison, NJ (US); Clemens Drews, San Jose, CA (US); Ronald Fagin, Los Gatos, CA (US); Daniel F. Gruhl, San Jose, CA (US); Neal R. Lewis, San Jose, CA (US); Pablo N. Mendes, San Francisco, CA (US); Meenakshi Nagarajan, San Jose, CA (US); Cartic Ramakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 15/471,933

(22) Filed: Mar. 28, 2017

(65) Prior Publication Data

US 2018/0285762 A1    Oct. 4, 2018

(51) Int. Cl.
*G06N 5/02*    (2006.01)
*G06N 20/00*   (2019.01)

(52) U.S. Cl.
CPC .............. *G06N 20/00* (2019.01); *G06N 5/022* (2013.01)

(58) Field of Classification Search
CPC ......... G06N 5/04; G06N 99/00; G06N 99/005
See application file for complete search history.

(56) References Cited

U.S. PATENT DOCUMENTS

| 8,027,977 | B2 | 9/2011 | Thamiratnam et al. |
| 9,202,178 | B2 | 12/2015 | Hall et al. |
| 2008/0140592 | A1* | 6/2008 | Ben-Hur ............ G06K 9/6218 706/12 |
| 2008/0319973 | A1* | 12/2008 | Thambiratnam ..... G06F 16/313 |
| 2010/0114890 | A1* | 5/2010 | Hagar ................... G06F 16/36 707/737 |
| 2013/0024407 | A1* | 1/2013 | Thompson ........... G06F 16/353 706/12 |

(Continued)

OTHER PUBLICATIONS

Slonim, Noam, and Naftali Tishby. "Document clustering using word clusters via the information bottleneck method." Proceedings of the 23rd annual international ACM SIGIR conference on Research and development in information retrieval. ACM, 2000: 208-215 (Year: 2000).*

(Continued)

*Primary Examiner* — Kamran Afshar
*Assistant Examiner* — Randall K. Baldwin
(74) *Attorney, Agent, or Firm* — Sherman IP LLP; Kenneth L. Sherman; Steven Laut

(57) ABSTRACT

One embodiment provides generating a similarity matrix corresponding to an input collection including initializing, by a processor, a working set as a collection of a multiple items. Until the similarity matrix converges: receiving a seed for similarity for at least one pair of items of the multiple items, and obtaining a similarity value for all other item pairs using a Naive Triangle Inequality process. The similarity is generated with obtained similarity values.

20 Claims, 6 Drawing Sheets

(56) References Cited

U.S. PATENT DOCUMENTS

| | | | |
|---|---|---|---|
| 2014/0025617 A1* | 1/2014 | Kang | G06N 5/04 706/46 |
| 2015/0227626 A1* | 8/2015 | Mahapatra | G06F 16/951 707/706 |
| 2015/0261846 A1* | 9/2015 | Hall | G06F 16/2425 707/738 |
| 2015/0324699 A1* | 11/2015 | Jebara | G06Q 50/00 706/12 |
| 2016/0078367 A1* | 3/2016 | Adjaoute | G06N 5/04 706/12 |
| 2016/0180242 A1* | 6/2016 | Byron | G06N 20/00 706/11 |
| 2016/0328253 A1* | 11/2016 | Majumdar | G06F 9/45504 |

OTHER PUBLICATIONS

Dhillon, Inderjit S., and Dharmendra S. Modha. "Concept decompositions for large sparse text data using clustering." Machine learning 42.1-2 (2001): 143-175. (Year: 2001).*

Ahmed, Eya Ben, Ahlem Nabli, and Faïez Gargouri. "SHACUN: Semi-supervised Hierarchical Active Clustering Based on Ranking Constraints." Industrial Conference on Data Mining. Springer, Berlin, Heidelberg, 2012: 194-208 (Year: 2012).*

Low, Yucheng, and Alice X. Zheng. "Fast top-k similarity queries via matrix compression." Proceedings of the 21st ACM international conference on Information and knowledge management. ACM, 2012. (Year: 2012).*

Basu, Tanmay, and C. A. Murthy. "A similarity based supervised decision rule for qualitative improvement of text categorization." Fundamenta Informaticae 141.4 (2015): 275-295, pp. 1-21. (Year: 2015).*

Zheng, Li, and Tao Li. "Semi-supervised hierarchical clustering." 2011 IEEE 11th International Conference on Data Mining. IEEE: 982-991 (Year: 2011).*

Mell, P., et al., "The NIST Definition of Cloud Computing", National Institute of Standards and Technology Special Publication 800-145, Sep. 2011, pp. 1-7, U.S. Department of Commerce, United States.

* cited by examiner

EFFICIENT SEMI-SUPERVISED CONCEPT ORGANIZATION ACCELERATED VIA AN INEQUALITY PROCESS

BACKGROUND

Many applications rely on terminologies that can be organized into hierarchical structures. Concept hierarchies help manage complexity, by hiding details when appropriate, but allowing users to delve into detail when necessary; they can also provide insight into the inter-relationships between terms, and have other uses as well. On the one hand, as often argued in the knowledge organization literature (including library sciences, Ontology and Terminology), it is necessary to involve people in crafting concept hierarchies based on our understanding of the fundamental properties or intended use of those hierarchies. On the other hand, research in hierarchical clustering methods has yielded ways to create concept hierarchies from the data automatically, in a bottom-up fashion.

SUMMARY

Embodiments relate to generating a similarity matrix corresponding to an input collection. One embodiment includes generating a similarity matrix corresponding to an input collection including initializing, by a processor, a working set as a collection of a multiple items. Until the similarity matrix converges: receiving a seed for similarity for at least one pair of items of the multiple items, and obtaining a similarity value for all other item pairs using a Naive Triangle Inequality process. The similarity is generated with obtained similarity values.

These and other features, aspects and advantages of the present invention will become understood with reference to the following description, appended claims and accompanying figures.

DETAILED DESCRIPTION

Figure 1:
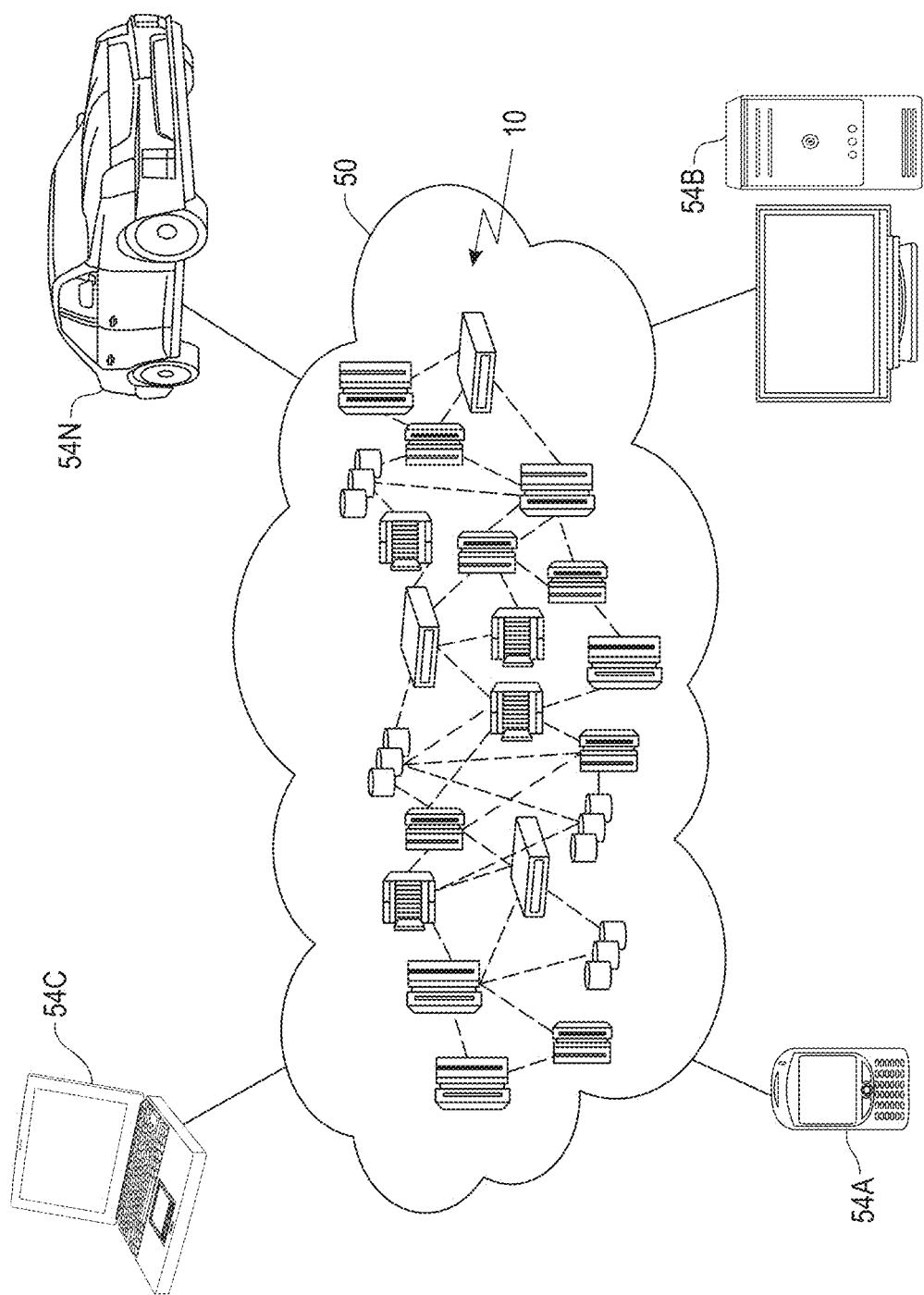
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide convergence of a similarity matrix that is guided by human domain-experts and a Naive Triangle inequality process to ensure minimization of the number of decisions that a human expert has to make in order to achieve convergence. In one embodiment, a method for generating a similarity matrix corresponding to an input collection includes initializing, by a processor, a working set as a collection of a multiple items. Until the similarity matrix converges: receiving a seed for similarity for at least one pair of items of the multiple items, and obtaining a similarity value for all other item pairs using a Naive Triangle Inequality process. The similarity is generated with obtained similarity values.

In one or more embodiments, "concept distance" provides that some pairs of concepts are more similar to each other than other pairs. In a human-driven class of approaches, the concept distances are often implicit or subjectively estimated, while in data-driven approaches, concept distances are automatically computed from input data. One or more embodiments provide a way to leverage input from both classes of approaches (i.e., human-driven class approaches and data-driven class approaches). One or more embodiments benefit from user expertise while reducing the manual effort needed to obtain the desired concept hierarchy. In one embodiment, a process performs automatic bottom-up calculations, using data as input, and validates key decisions through receiving human top-down input. Human input from a Subject Matter Expert (SME) guides the recalculation, with the search space dramatically reduced through our Naive Triangle Inequality (NTI) processing. As a result of the application of the NTI processing, human effort is reduced by having the processing automate several decisions, and algorithmic accuracy is incrementally improved receiving input.

Business case understanding the conceptual hierarchy of objects is a critical part of any artificial intelligence (AI) or machine learning (ML) application. Some examples are: document queries may be expanded or narrowed using the similarity between two words; analytics that identify particular aspects of sentiment in a product review need to understand the semantic similarity between the products' names and their models; knowing that an image of a car is dissimilar to an image of a motorcycle, yet that both can be classified as a vehicle, is critical for defense and law enforcement applications. Such applications provide a distinctive business advantage in cognitive computing, because of their increased accuracy and learning ability. One or more embodiments, provide a process to quickly and accurately quantify and detect the boundaries of similarity between large sets of objects. By detecting similarity boundaries, applications will not only be able to more accurately detect similarity, they will be able to do it quickly, providing accurate and fast response to critical cognitive computing.

One or more embodiments prescribes a different technique to evaluate the weaknesses of the conceptual models via the NTI, where the elements reporting most extreme values are selected first to collect feedback as they are elements whose feedback convey the most information to the model. By using the NTI processing, the system is capable of identifying the concepts for which human feedback would convey the most knowledge. By this mechanism, one or more embodiments assures that the most informative feedback is collected at the earliest in the process. By collecting the most informative feedback sooner, the system significantly shortens the model convergence time.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
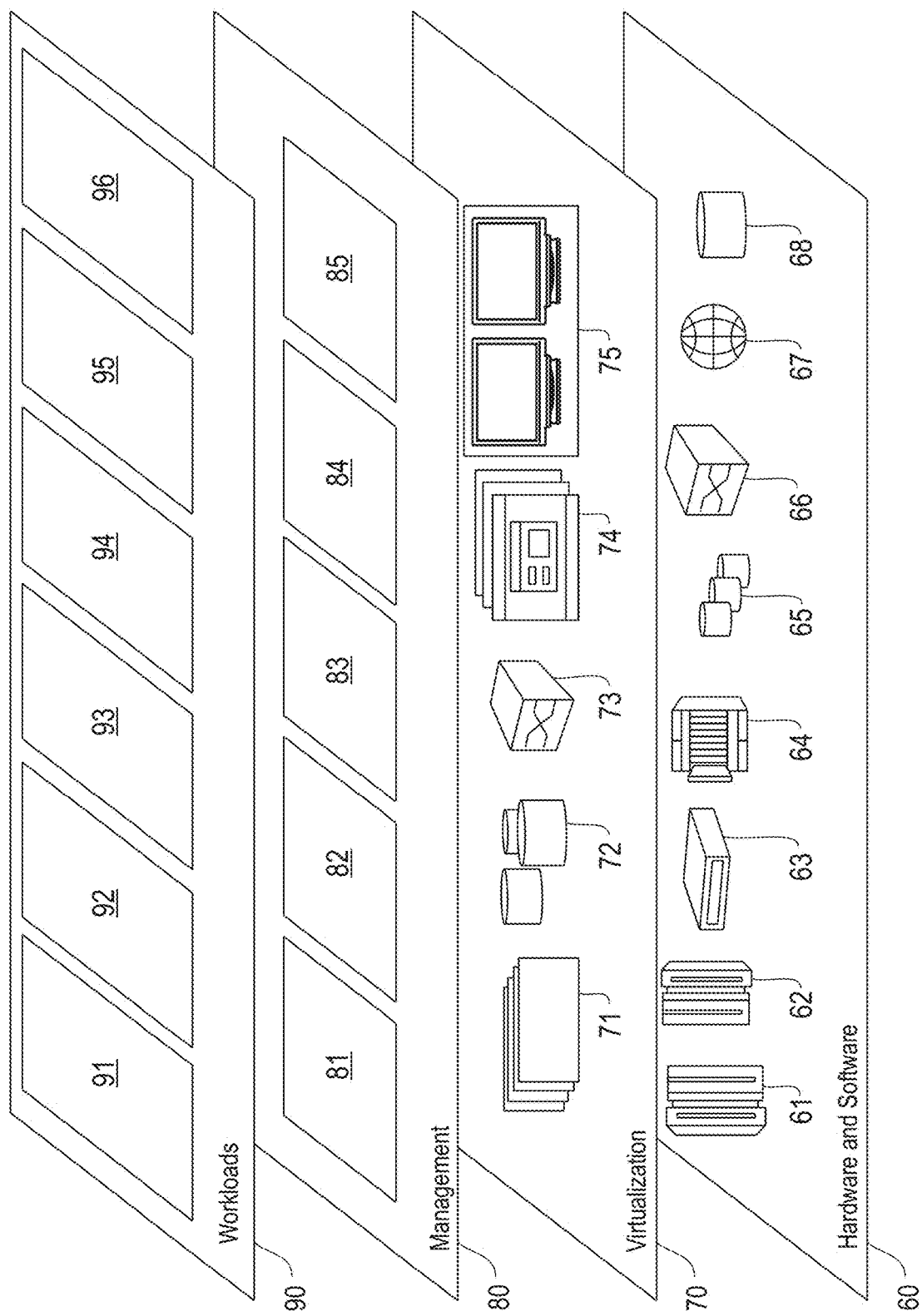
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a similarity matrix corresponding to an input collection processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
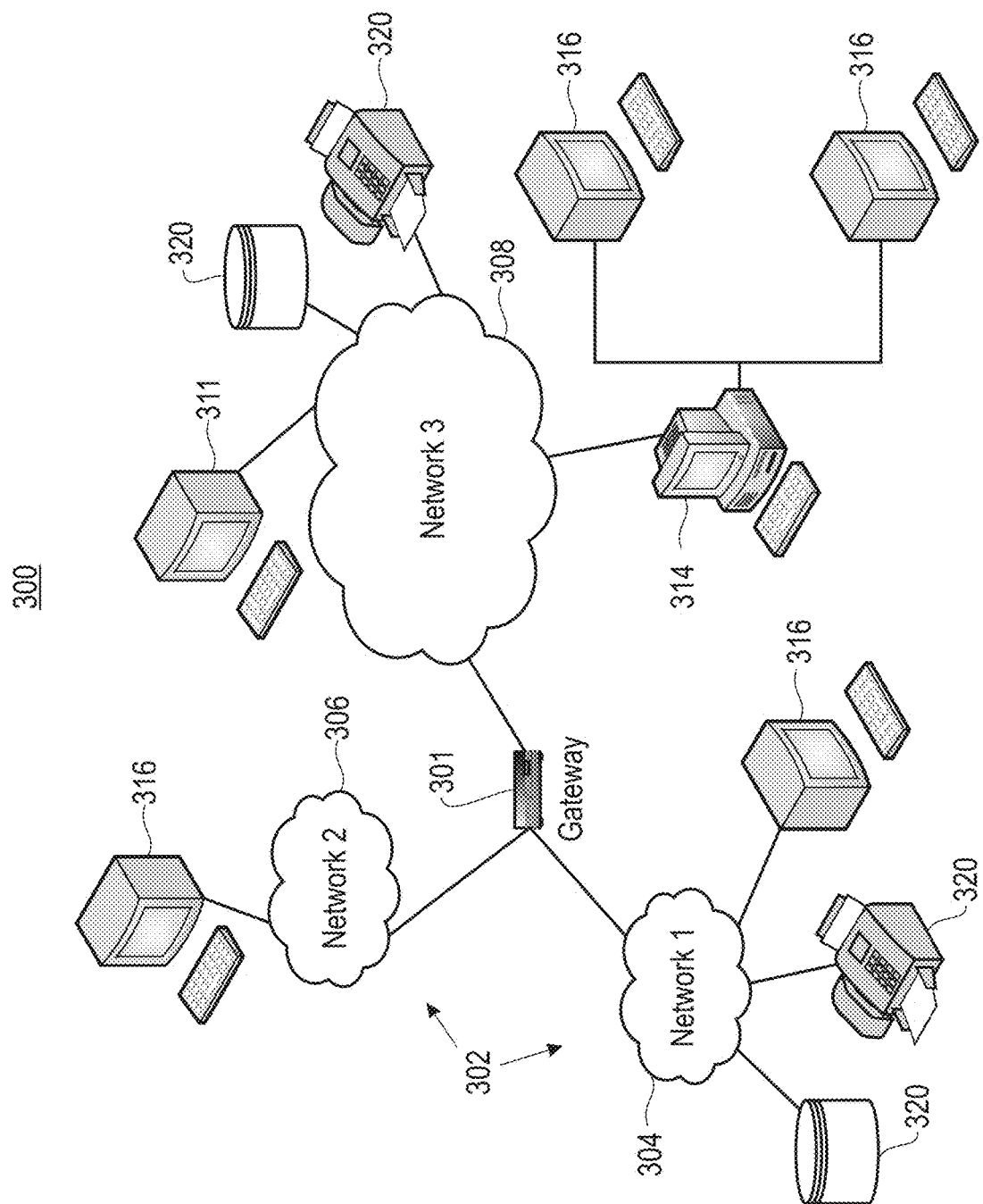
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
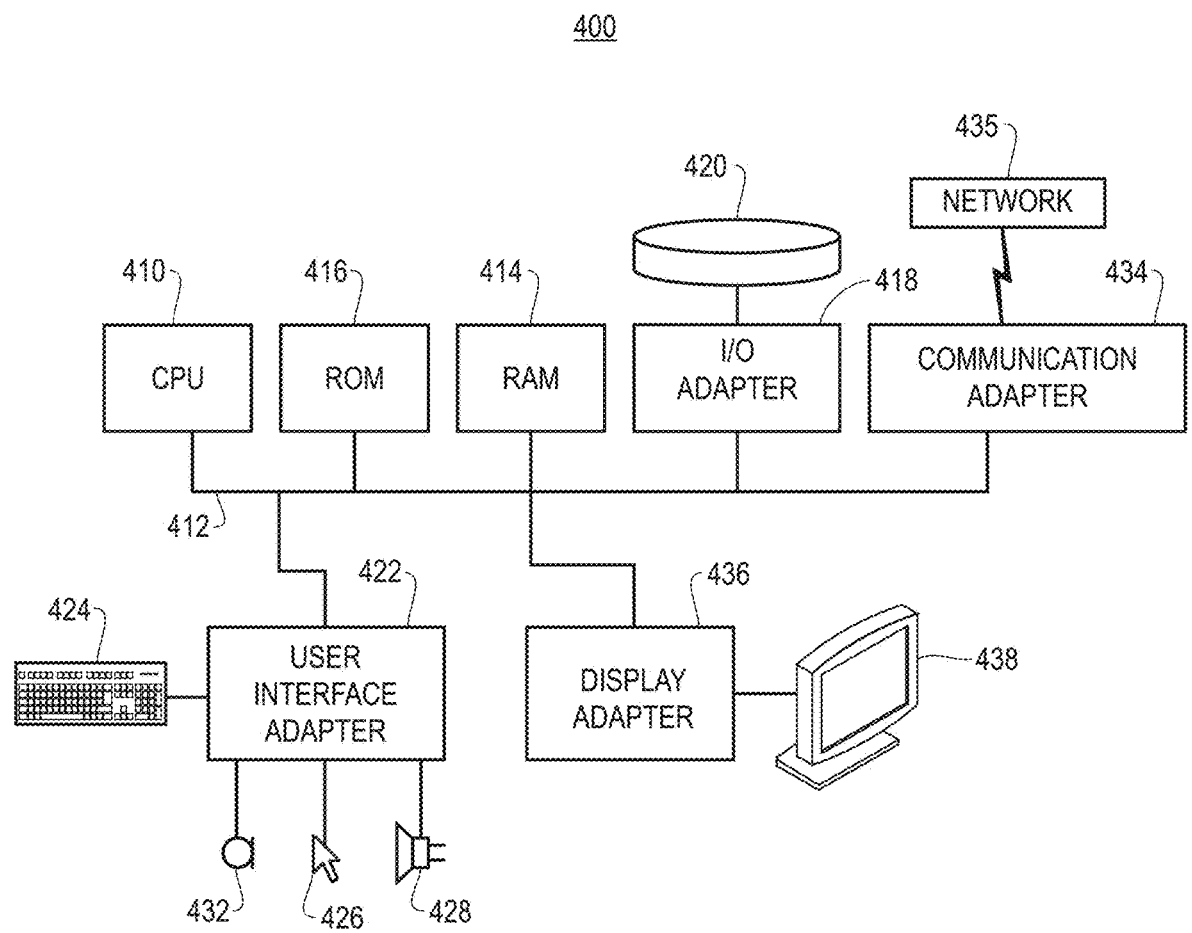
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
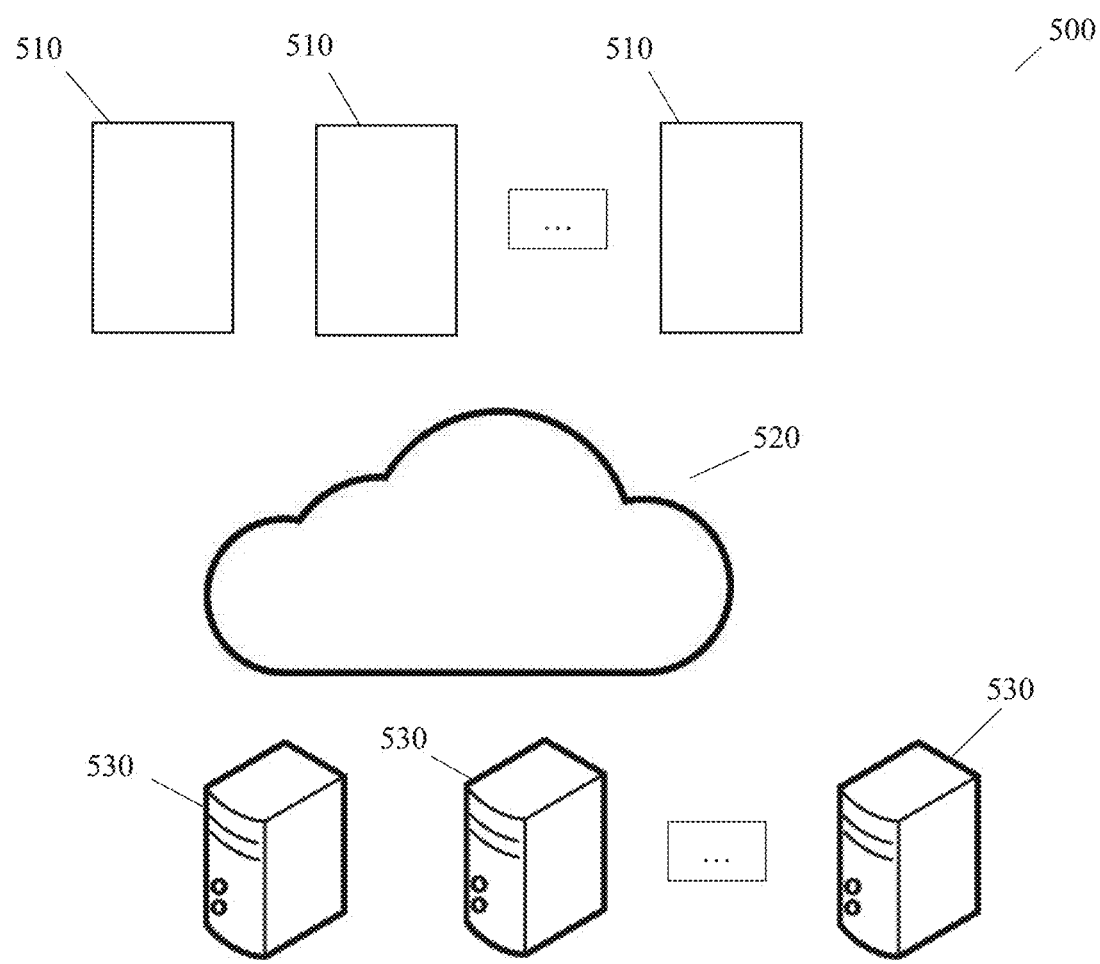
FIG. 5 is a block diagram illustrating system for generating a similarity matrix corresponding to an input collection, according to one embodiment.

FIG. 5 is a block diagram illustrating a system 500 for generating a similarity matrix corresponding to an input collection, according to one embodiment. In one embodiment, the system 500 includes client devices 510 (e.g., mobile devices, smart devices, computing systems, etc.), a cloud or resource sharing environment 520, and servers 530. In one embodiment, the client devices are provided with cloud services from the servers 530 through the cloud or resource sharing environment 520.

In one embodiment, system 500 provides NTI processing (e.g., by the client devices 510, the cloud or resource sharing environment, one or more servers 530, or any combination) that uses several matrices, including a similarity matrix S, and a distance matrix D. The matrix S contains similarities between items (each cell is the similarity between the row and column items). In one embodiment, "not at all similar" is represented by 1, and "exactly similar" is represented by 10. The diagonal entries of S are thus 10, and the matrix is symmetric. In the distance matrix D, the cells are the distance between the item represented by the row and item represented by the column. Trivially a definition of D=10−S may be employed. Since initially the real values for S (and hence, D) are unknown, two matrices are required, Dmax and Dmin, that store the maximum and minimum values presumed that D could take. In cases where there is a known value (provided as input), these are the same. If nothing is known the values are 9 (Dmax) and 0 (Dmin) for upper and lower bounds.

In one embodiment, at any given time, the Best Guess matrix B may be determined as B=0.5*(Dmin+Dmax). At any given time, the uncertainty matrix U may be determined as U=Dmax−Dmin. Assume there is a (human) oracle that can provide the system 500 an exact value of a cell in S at any time, although there is a cost associated with querying the oracle. Furthermore, assume that there is a boolean matrix not_user_set, with all entries initialized to true. Each entry not_use_set[k][k'] in this boolean matrix represents whether the oracle has yet provided an exact value for the similarity S[k][k']. One embodiment queries the oracle for such exact values, guided by picking cells for which the uncertainty is maximum. This new information, for one pair of items, is then used to sharpen the distance bounds for other pairs of items. One embodiment uses the triangle inequality for this purpose: it provides that for any i, j, and k, that the distance D(i, k) is at most D(i, j)+D(j, k), where i, j and k are positive integers. The triangle inequality holds for points in the plane, and in many other settings, and fits intuition about distance and similarity in general. Applying the triangle inequality, and that Dmin and Dmax hold, then for example D(i, j)>=D(i, k)−D(j, k)>=Dmin(i, k)−Dmax(j, k). One embodiment uses such reasoning, together with conditions that all distances are at least zero and at most nine.

With noise and human inconsistency, however, the triangle inequality may not apply, and the inferred bounds may have Dmin>Dmax as a result. Here it is coped by simply swapping these bounds. It should be noted that processing in the system 500 performs the distance bound updates only for those cells in the similarity matrix S, for which the corresponding value in the not_user_set matrix is true. This ensures that exact values provided by the oracle are not overwritten. One portion of the NTI processing proceeds as follows. Such processing portions are repeated until some desired test of convergence is satisfied, such as all U[i, j] are zero. Initially, Dmax is set to 9 and Dmin to 0 for all cells and all values in not_user_set to true. The processing proceeds as follows:

(I) Search for cells where U is at a max. Randomly select one such max cell, U[i, j].
(II) Provide a query (e.g., through a user interface, display, etc.) to the oracle for an exact value for that cell in S.
(III) Update the corresponding cells Dmin[i, j] and Dmin [j, i], and the corresponding cells Dmax[i, j] and Dmax[j, i], with this new data; these will be the same since the exact value in S is known.
(IV)

--- not_user_set[i, j] = false,
// update Dmax values
for k, k' in 1...n
if not_user_set[k, k'] then Dmax[k, k'] := min{ Dmax{k, k'], Dmax[k, i] + Dmax[i, j] + Dmax[j, k']}
// update Dmin values for k, k', k" in 1...n
if not_user_set[k, k'] then Dmin[k, k'] = max{ Dmin[k, k'], Dmin[k, k"] − Dmax[k", k'] }
// maintain Dmin < Dmax for all pairs
for k, k' in 1...m
if Dmin[k, k'] > Dmax[k, k'] then swap them.

---

In one embodiment, a running example is presented as follows. Imagine a doctor is trying to categorize ten (10) items used in a minor injury clinic as follows:
0=>"bacitracin",
1=>"bandaids",
2=>"gauzepad",
3=>"ibuprofen",
4=>"naproxen",
5=>"neosporin",
6=>"polymyxin",
7=>"polysporin",
8=>"sterristrips",
9=>"sutures"

Conventionally, the Doctor will categorize the ten items by answering pointwise questions about how similar she feels any two items are. Note that while this example is for ease of explanation and only has ten items, one could just "glance at it" and figure out the categorization. With 200-2000 or more items, however, the problem could become unfeasible. In one example embodiment, the process starts with (I) and determines that since there is no information on the terms at all, any pair (besides reflexive ones) is randomly selected. The processing in system 500 selects how similar are "polymyxin" and "sterristrips." The system 500 receives a reply to a query to the SME oracle of "1", meaning not at all similar (II). The process updates (III) Dmin and Dmax for the cells [6, 8] and [8, 6] to 9 and 9 (since there is an exact value). Now the processing goes through all the cells. Consider 0, 8—the similarity of sterristrips and bacitracin. (IV) The update loop for Dmax doesn't change Dmax[0, 8], since D[i, j]=9 when i=6 and j=8. The update loop for Dmin does not change Dmin[0, 8], since all Dmax's remain at 9. But consider later the processing receives information that bandaids are very similar (8) to sterristrips, so that Dmax [1, 8]=Dmin[1, 8]=2. When the processing computes the unknown bandaids to polymyxin now, it is determined that Dmax[6, 1] is unchanged, but Dmin[6, 1]=max{Dmin[6, 1], Dmin[6, 8]−Dmax[8, 1]}=max{0, 9-2}=7. This information provides that the similarity between bandaids and polymixin is probably in the range from 1 to 3 (that is, not very similar). Using the baseline approach, the Doctor will need to answer 32 such questions before the similarity matrix converges. In one embodiment, using NTI it will only take 14 questions. Once this similarity matrix is set, the system can use a clustering algorithm such as k-median and break this set into ibuprofen[3], naproxen[4], bandaids[1], gauzepad[2], steristrips[8], sutures[9], bacitracin[0], neosporin[5], polymyxin[6], polysporin[7], as expected.

Figure 6:
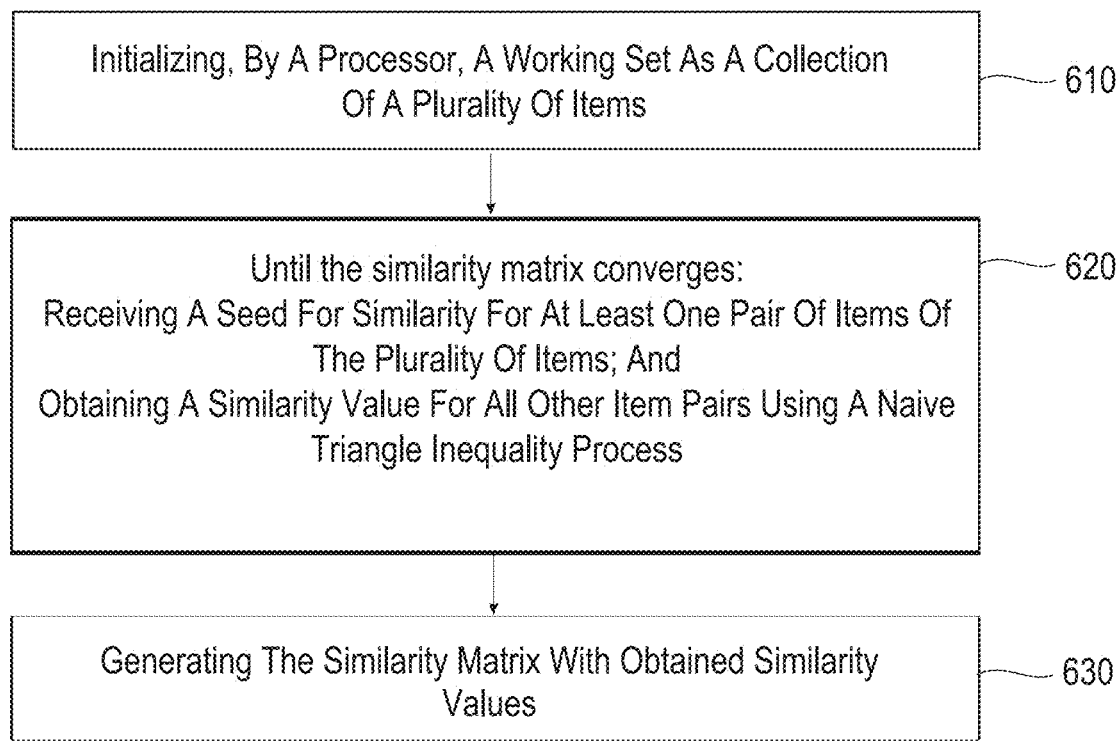
FIG. 6 illustrates a block diagram for a process for generating a similarity matrix corresponding to an input collection, according to one embodiment.

FIG. 6 illustrates a block diagram for a process 600 for generating a similarity matrix corresponding to an input collection, according to one embodiment. In block 610, process 600 initializes, by a processor, a working set as a collection of a multiple items (e.g., words, phrases, etc.). In block 620, until the similarity matrix converges, process 600 provides for receiving a seed for similarity for at least one pair of items of the multiple items, and obtaining a similarity value for all other item pairs using a Naive Triangle Inequality process. In block 630, process 600 provides for generating the similarity matrix with obtained similarity values.

In one embodiment, in process 600 the generated similarity matrix is provided (e.g., to a computing device, processor and memory, etc.) for clustering processing. In one embodiment, in process 600 the seed for similarity for the at least one pair of items is received by the processor from an SME via a user interface.

In one embodiment, in process 600 the similarity matrix includes similarity values between items, and each cell in the similarity matrix represents the similarity between row and column items. In one embodiment, the Naive Triangle Inequality process uses a distance matrix, and cells in the distance matrix represent distance between an item represented by a row and an item represented by a column. In one embodiment, in process 600 the Naive Triangle Inequality process performs distance bound updates for cells in the similarity matrix for which a corresponding value in a not_user_set matrix is true.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a similarity matrix corresponding to an input collection comprising:
   initializing, by a processor, a working set as a collection of a plurality of items;
   until the similarity matrix converges based on a particular test of convergence:
      receiving a seed for similarity for at least one pair of items of the plurality of items; and
      obtaining, using the processor, a similarity value for all other item pairs using a Naive Triangle Inequality process that uses a maximum distance matrix Dmax (j, k) and a minimum distance matrix Dmin(i, k), determines a best guess matrix B and an uncertainty matrix U(i, j) from the minimum distance matrix Dmin (i, k) and the maximum distance matrix Dmax (j, k), and determines a distance matrix D, wherein i, j and k are positive integers;
   swapping an upper bound value for Dmax and a lower bound value for Dmin upon Dmin(i, k)>Dmax(j, k); and
   generating, by the processor, the similarity matrix with obtained similarity values based on the Naive Triangle Inequality process.

2. The method of claim 1, further comprising:
   providing the generated similarity matrix for clustering processing.

3. The method of claim 2, wherein the plurality of items comprises one of words and phrases.

4. The method of claim 3, further comprising:
   searching, by the processor, for cells in the uncertainty matrix U(i, j) for a maximum uncertainty value, and randomly selecting a cell with the maximum uncertainty value; and
   updating, by the processor, corresponding cells for Dmin (i, j), Dmin (j, i), Dmax(i, j) and Dmax(j, i);
   wherein the seed for similarity for the at least one pair of items is received by the processor from a subject matter expert (SME) via a user interface in response to the random selection of the cell with the maximum uncertainty value.

5. The method of claim 1, wherein the similarity matrix comprises similarity values between items, and each cell in the similarity matrix represents the similarity between row and column items.

6. The method of claim 5, wherein cells in the distance matrix D represent distance between an item represented by a row and an item represented by a column.

7. The method of claim 6, wherein the Naive Triangle Inequality process performs distance bound updates for cells in the similarity matrix for which a corresponding cell value in a Boolean matrix is set to a value representing a true state.

8. A computer program product for generating a similarity matrix corresponding to an input collection, the computer program product comprising a computer readable storage medium having program instructions embodied therewith, the program instructions executable by a processor to cause the processor to:
   initialize, by the processor, a working set as a collection of a plurality of items;
   until the similarity matrix converges:
      receive, by the processor, a seed for similarity for at least one pair of items of the plurality of items; and
      obtain, by the processor, a similarity value for all other item pairs using a Naive Triangle Inequality process that uses a maximum distance matrix Dmax(j, k) and a minimum distance matrix Dmin(i, k), determines a best guess matrix B and an uncertainty matrix U(i, j) from the minimum distance matrix Dmin (i, k) and the maximum distance matrix Dmax(j, k), and determines a distance matrix D, wherein i, j and k are positive integers;
   swap, by the processor, an upper bound value for Dmax and a lower bound value for Dmin upon Dmin(i, k)>Dmax(j, k); and
   generate, by the processor, the similarity matrix with obtained similarity values based on the Naive Triangle Inequality process.

9. The computer program product of claim 8, wherein the program instructions executable by the processor to further cause the processor to:
provide, by the processor, the generated similarity matrix for clustering processing.

10. The computer program product of claim 9, wherein the plurality of items comprises one of words and phrases.

11. The computer program product of claim 10, wherein:
the program instructions executable by the processor further cause the processor to:
search, by the processor, for cells in the uncertainty matrix U(i, j) for a maximum uncertainty value, and randomly selecting a cell with the maximum uncertainty value; and
update, by the processor, corresponding cells for Dmin (i, j), Dmin (j, i), Dmax(i, j) and Dmax(j, i); and
the seed for similarity for the at least one pair of items is received by the processor from a subject matter expert (SME) via a user interface in response to the random selection of the cell with the maximum uncertainty value.

12. The computer program product of claim 11, wherein the similarity matrix comprises similarity values between items, and each cell in the similarity matrix represents the similarity between row and column items.

13. The computer program product of claim 12, wherein cells in the distance matrix D represent distance between an item represented by a row and an item represented by a column.

14. The computer program product of claim 13, wherein the Naive Triangle Inequality process performs distance bound updates for cells in the similarity matrix for which a corresponding cell value in a Boolean matrix is set to a value representing a true state.

15. An apparatus comprising:
a memory configured to store instructions; and
a processor configured to execute the instructions to:
initialize, by the processor, a working set as a collection of a plurality of items;
until the similarity matrix converges:
receive a seed for similarity for at least one pair of items of the plurality of items; and
obtain a similarity value for all other item pairs using a Naive Triangle Inequality process that uses a maximum distance matrix Dmax(j, k) and a minimum distance matrix Dmin(i, k), determines a best guess matrix B and an uncertainty matrix U(i, j) from the minimum distance matrix Dmin (i, k) and the maximum distance matrix Dmax(j, k), and determines a distance matrix D, wherein i, j and k are positive integers;
swap an upper bound value for Dmax and a lower bound value for Dmin upon Dmin(i, k)>Dmax (j, k); and
generate the similarity matrix with obtained similarity values based on the Naive Triangle Inequality process.

16. The apparatus of claim 15, wherein the processor is further configured to execute the instructions to:
provide the generated similarity matrix for clustering processing.

17. The apparatus of claim 16, wherein the plurality of items comprises one of words and phrases.

18. The apparatus of claim 17, wherein:
the processor is further configured to execute the instructions to:
search for cells in the uncertainty matrix U(i, j) for a maximum uncertainty value, and randomly selecting a cell with the maximum uncertainty value; and
update corresponding cells for Dmin (i, j), Dmin (j, i), Dmax(i, j) and Dmax(j, i);
the seed for similarity for the at least one pair of items is received by the processor from a subject matter expert (SME) via a user interface in response to the random selection of the cell with the maximum uncertainty value;
the similarity matrix comprises similarity values between items; and
each cell in the similarity matrix represents the similarity between row and column items.

19. The apparatus of claim 15, wherein the cells in the distance matrix D represent distance between an item represented by a row and an item represented by a column.

20. The apparatus of claim 19, wherein the Naive Triangle Inequality process performs distance bound updates for cells in the similarity matrix for which a corresponding value in a Boolean matrix is set to a value representing a true state.

* * * * *